(12) United States Patent
Arar et al.

(10) Patent No.: US 10,452,410 B2
(45) Date of Patent: Oct. 22, 2019

(54) CONTEXT AWARE USER INTERFACE

(71) Applicant: International Business Machines Corporation, Armonk, NY (US)

(72) Inventors: Raphael I. Arar, Santa Cruz, CA (US); Sunhwan Lee, Menlo Park, CA (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 15/334,185

(22) Filed: Oct. 25, 2016

(65) Prior Publication Data

US 2018/0113586 A1 Apr. 26, 2018

(51) Int. Cl.
| | |
|---|---|
| *G06F 17/00* | (2019.01) |
| *G06F 9/451* | (2018.01) |
| *H04L 29/08* | (2006.01) |
| *G06F 3/0484* | (2013.01) |

(52) U.S. Cl.
CPC ............ *G06F 9/451* (2018.02); *G06F 3/0484* (2013.01); *H04L 67/22* (2013.01); *H04L 67/306* (2013.01)

(58) Field of Classification Search
CPC ...... G06F 3/0484; G06F 9/451; G06F 9/4443; H04L 67/1097; H04L 67/22; H04L 67/306
See application file for complete search history.

(56) References Cited

U.S. PATENT DOCUMENTS

| | | | | |
|---|---|---|---|---|
| 5,726,688 A | * | 3/1998 | Siefert .................. | G06F 3/0482 715/821 |
| 5,910,799 A | * | 6/1999 | Carpenter ............... | G06F 3/033 715/866 |
| 7,523,226 B2 | | 4/2009 | Anderson et al. | |
| 8,024,732 B2 | | 9/2011 | Sheehan et al. | |
| 8,655,464 B2 | * | 2/2014 | Dollar, Jr. ............... | G06F 16/68 700/94 |
| 8,799,635 B2 | * | 8/2014 | Smith .................... | G06F 1/1684 713/100 |

(Continued)

FOREIGN PATENT DOCUMENTS

WO 2015183705 A1 12/2015

OTHER PUBLICATIONS

Castillejo, E. et al., "Modelling Users, Context and Devices for adaptive User Interface Systems," (International Journal of Pervasive Computing and Communications vol. 10 No. 1, 2014, pp. 69-91.*

(Continued)

*Primary Examiner* — Cesar B Paula
*Assistant Examiner* — James H. Blackwell
(74) *Attorney, Agent, or Firm* — Zilka-Kotab, P.C.

(57) ABSTRACT

A computer-implemented method according to one embodiment includes identifying one or more historical instances of device usage, determining historical contextual data for each of the one or more historical instances of the device usage, creating an event in association with the one or more historical instances of the device usage and the historical contextual data, identifying a real-time occurrence of the event by comparing real-time contextual data to the historical contextual data, and in response to identifying the real-time occurrence of the event, adjusting one or more aspects of a user interface (UI) of the device based on the one or more historical instances of the device usage.

14 Claims, 6 Drawing Sheets

(56) References Cited

U.S. PATENT DOCUMENTS

| | | | |
|---|---|---|---|
| 8,843,853 B1* | 9/2014 | Smoak | G06F 3/0482 715/839 |
| 8,898,667 B2* | 11/2014 | Do | G06F 9/4843 718/100 |
| 8,972,878 B2* | 3/2015 | Mohler | G06F 3/04817 715/765 |
| 9,075,883 B2 | 7/2015 | Verkasalo | |
| 9,244,583 B2* | 1/2016 | Lovitt | G06F 3/0481 |
| 9,300,720 B1* | 3/2016 | Qiu | G06F 9/45504 |
| 9,319,868 B2* | 4/2016 | Yang | H04W 8/22 |
| 9,569,069 B2* | 2/2017 | Balasaygun | G06F 3/0481 |
| 2003/0090515 A1* | 5/2003 | Chang | H04N 5/4401 715/745 |
| 2003/0179229 A1* | 9/2003 | Van Erlach | G06F 1/1626 715/744 |
| 2007/0162907 A1* | 7/2007 | Herlocker | G06Q 10/10 718/100 |
| 2007/0300185 A1* | 12/2007 | Macbeth | G06F 9/451 715/825 |
| 2008/0005679 A1* | 1/2008 | Rimas-Ribikauskas | G01C 21/3688 715/745 |
| 2008/0052729 A1 | 2/2008 | Paul et al. | |
| 2008/0177726 A1* | 7/2008 | Forbes | G06F 16/907 |
| 2009/0055739 A1* | 2/2009 | Murillo | G06F 9/451 715/708 |
| 2009/0240647 A1* | 9/2009 | Green | G06N 7/005 706/52 |
| 2009/0288007 A1* | 11/2009 | Leacock | G06Q 10/10 715/716 |
| 2009/0307693 A1* | 12/2009 | Do | G06F 9/4843 718/100 |
| 2010/0159904 A1* | 6/2010 | Colligan | G06Q 30/02 455/414.2 |
| 2010/0161720 A1* | 6/2010 | Colligan | G06Q 30/02 709/203 |
| 2010/0241663 A1* | 9/2010 | Huang | G06Q 30/02 707/770 |
| 2010/0312369 A1* | 12/2010 | Dollar, Jr. | G06F 16/68 700/94 |
| 2011/0072492 A1 | 3/2011 | Mohler et al. | |
| 2011/0126119 A1* | 5/2011 | Young | G06F 3/048 715/744 |
| 2012/0265978 A1* | 10/2012 | Shenfield | G06F 9/451 713/100 |
| 2012/0271913 A1* | 10/2012 | Tallgren | H04W 24/00 709/217 |
| 2013/0086481 A1* | 4/2013 | Balasaygun | G06F 3/0481 715/745 |
| 2013/0151983 A1* | 6/2013 | Lovitt | G06F 3/0481 715/745 |
| 2013/0152001 A1* | 6/2013 | Lovitt | G06F 3/0482 715/765 |
| 2013/0198506 A1* | 8/2013 | Smith | G06F 1/1684 713/100 |
| 2014/0096077 A1* | 4/2014 | Jacob | G06F 3/013 715/810 |
| 2014/0157143 A1* | 6/2014 | Ronkainen | G06K 9/00892 715/744 |
| 2014/0201681 A1* | 7/2014 | Mahaffey | H04M 1/72569 715/846 |
| 2014/0359472 A1* | 12/2014 | Lefor | G06F 3/0481 715/746 |
| 2014/0365907 A1* | 12/2014 | De Freitas | G06F 8/38 715/746 |
| 2015/0227118 A1 | 8/2015 | Wong | |
| 2017/0322690 A1* | 11/2017 | Chen | G06F 3/0484 |
| 2018/0157377 A1* | 6/2018 | Popov | G06F 3/048 |

OTHER PUBLICATIONS

Olga, K. "Adaptive User Interface Patterns for Mobile Applications," Jun. 25, 2014, Master's Thesis, University of Eastern Finland, 136 total pages.*

NIST Cloud Computing Program, Dec. 9, 2013, Retrieved From http://www.nist.gov/itl/cloud/, pp. 1-2.

Mell et al., "Definition of Cloud Computing," National Institute of Standards and Technology, Information Technology Laboratory, Version 15, 2009, pp. 2.

Mell et al., "The NIST Definition of Cloud Computing," NIST Special Publication 800-145, 2011, pp. 1-7.

* cited by examiner

CONTEXT AWARE USER INTERFACE

BACKGROUND

The present invention relates to user interfaces, and more specifically, this invention relates to adjusting a user interface based on a context of historical instances of device usage.

Computing devices are a popular tool in modern society. The user interface (UI) of these computing devices is the bridge that connects the devices to humans. However, a growing abundance of applications to be used with the devices makes a present interaction with devices time-consuming and unintuitive. As a result, there is a need for UIs that understand personal usage patterns and the context of usage in order to make the interaction between users and the UI easier and more direct.

SUMMARY

A computer-implemented method according to one embodiment includes identifying one or more historical instances of device usage, determining historical contextual data for each of the one or more historical instances of the device usage, creating an event in association with the one or more historical instances of the device usage and the historical contextual data, identifying a real-time occurrence of the event by comparing real-time contextual data to the historical contextual data, and in response to identifying the real-time occurrence of the event, adjusting one or more aspects of a user interface (UI) of the device based on the one or more historical instances of the device usage.

According to another embodiment, a computer program product for implementing a context aware user interface (UI) comprises a computer readable storage medium having program instructions embodied therewith, wherein the computer readable storage medium is not a transitory signal per se, and where the program instructions are executable by a processor to cause the processor to perform a method comprising identifying one or more historical instances of device usage, utilizing the processor, determining historical contextual data for each of the one or more historical instances of the device usage, utilizing the processor, creating an event in association with the one or more historical instances of the device usage and the historical contextual data, utilizing the processor, identifying, utilizing the processor, a real-time occurrence of the event by comparing real-time contextual data to the historical contextual data, and in response to identifying the real-time occurrence of the event, adjusting, utilizing the processor, one or more aspects of a UI of the device based on the one or more historical instances of the device usage.

A system according to another embodiment includes a processor, and logic integrated with the processor, executable by the processor, or integrated with and executable by the processor, where the logic is configured to identify one or more historical instances of device usage, determine historical contextual data for each of the one or more historical instances of the device usage, create an event in association with the one or more historical instances of the device usage and the historical contextual data, identify a real-time occurrence of the event by comparing real-time contextual data to the historical contextual data, and in response to identifying the real-time occurrence of the event, adjust one or more aspects of a user interface (UI) of the device based on the one or more historical instances of the device usage.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for implementing a context aware user interface. Various embodiments provide a method for identifying historical usage of devices, as well as a context of that usage, and using such historical usage and context to adjust an interface of the devices.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing a context aware user interface.

In one general embodiment, a computer-implemented method includes identifying one or more historical instances of device usage, determining historical contextual data for each of the one or more historical instances of the device usage, creating an event in association with the one or more historical instances of the device usage and the historical contextual data, identifying a real-time occurrence of the event by comparing real-time contextual data to the historical contextual data, and in response to identifying the real-time occurrence of the event, adjusting one or more aspects of a user interface (UI) of the device based on the one or more historical instances of the device usage.

In another general embodiment, a computer program product for implementing a context aware user interface (UI) comprises a computer readable storage medium having program instructions embodied therewith, wherein the computer readable storage medium is not a transitory signal per se, and where the program instructions are executable by a processor to cause the processor to perform a method comprising identifying one or more historical instances of device usage, utilizing the processor, determining historical contextual data for each of the one or more historical instances of the device usage, utilizing the processor, creating an event in association with the one or more historical instances of the device usage and the historical contextual data, utilizing the processor, identifying, utilizing the processor, a real-time occurrence of the event by comparing real-time contextual data to the historical contextual data, and in response to identifying the real-time occurrence of the event, adjusting, utilizing the processor, one or more aspects of a UI of the device based on the one or more historical instances of the device usage.

In another general embodiment, a system includes a processor, and logic integrated with the processor, executable by the processor, or integrated with and executable by the processor, where the logic is configured to identify one or more historical instances of device usage, determine historical contextual data for each of the one or more historical instances of the device usage, create an event in association with the one or more historical instances of the device usage and the historical contextual data, identify a real-time occurrence of the event by comparing real-time contextual data to the historical contextual data, and in response to identifying the real-time occurrence of the event, adjust one or more aspects of a user interface (UI) of the device based on the one or more historical instances of the device usage.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
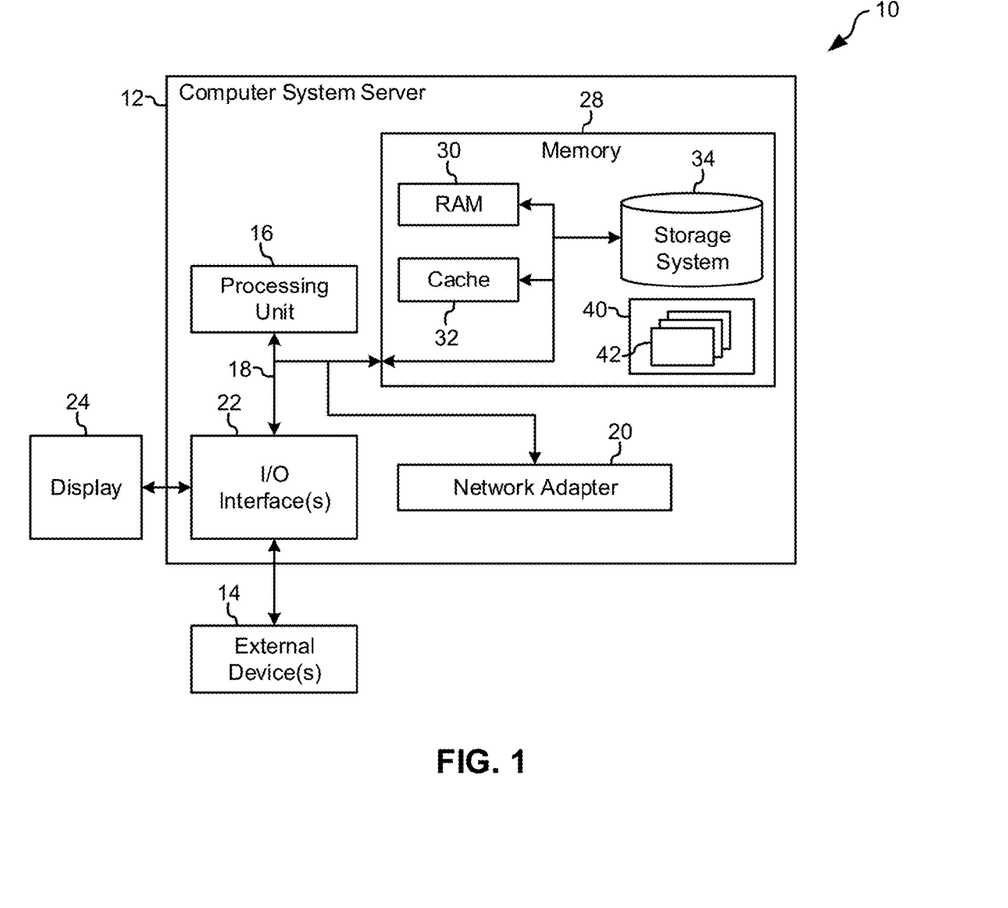
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
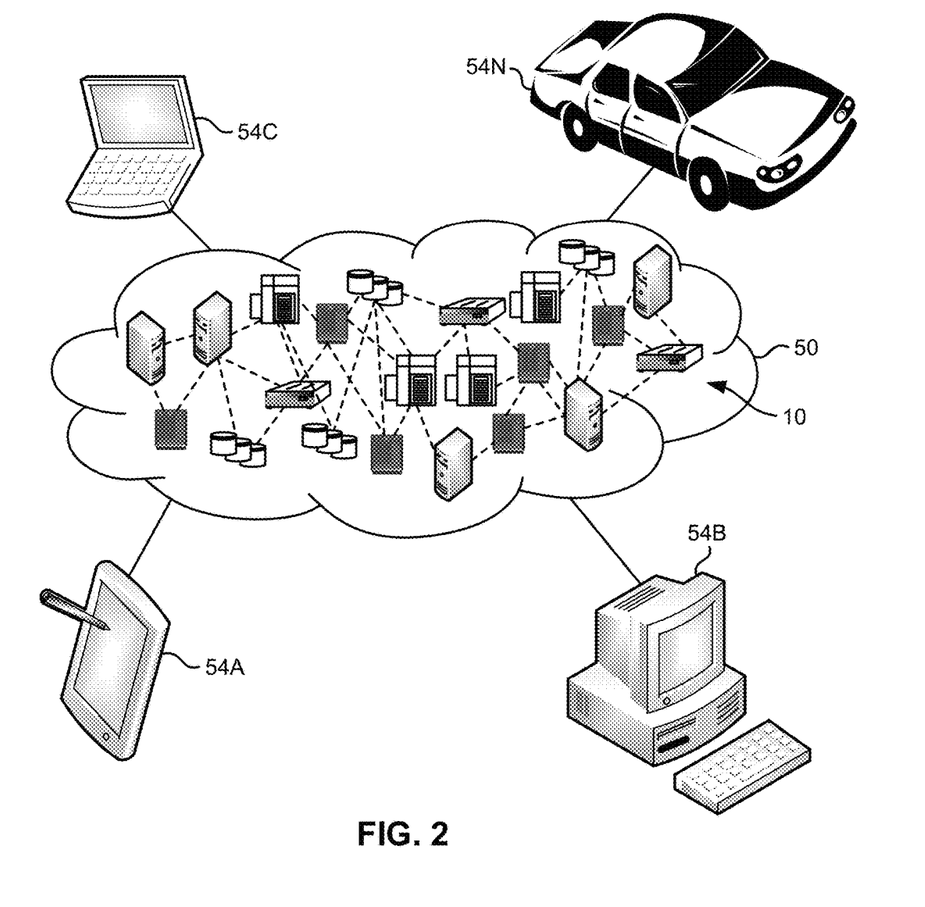
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
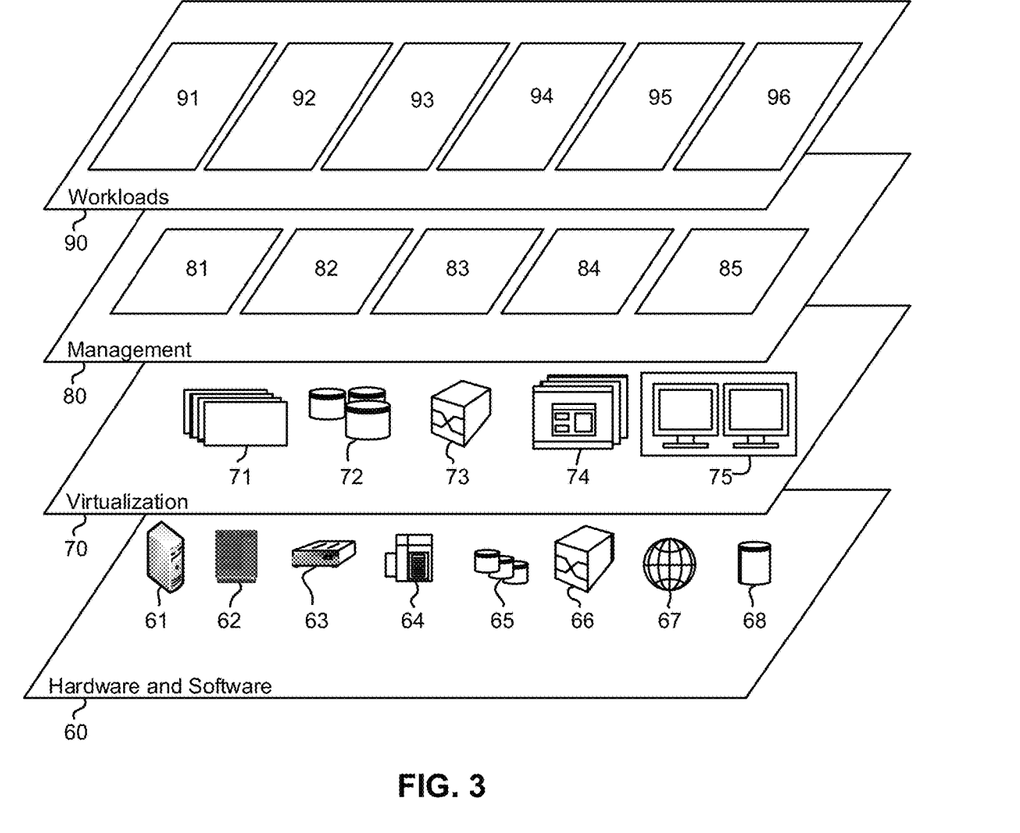
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and language and behavior determination 96.

Figure 4:
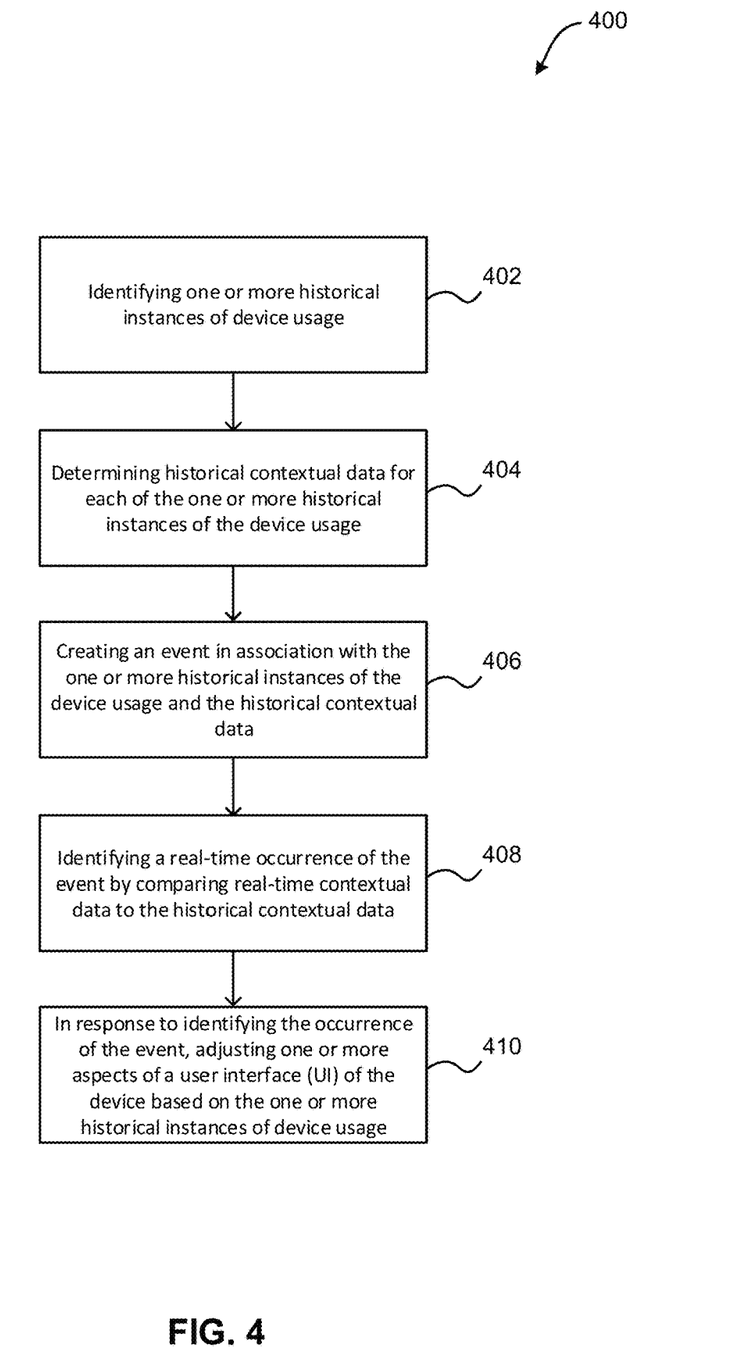
FIG. 4 illustrates a method for implementing a context aware user interface, in accordance with one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where one or more historical instances of device usage are identified. In one embodiment, each instance of historical instances of device usage may include a past performance of one or more actions utilizing a device by a user. For example, the one or more actions may include running of one or more applications by a device, sending and/or receiving data by the device, etc. In another embodiment, the device may include any computing device. For example, the device may include a mobile computing device, a desktop computing device, a wearable computing device, a virtual reality device, etc.

Additionally, in one embodiment, the one or more historical instances of the device usage may be identified for a single user. In another embodiment, the one or more historical instances of the device usage may be identified for a plurality of users. For example, the one or more historical instances of the device usage may be identified for a predetermined group of users (e.g., users within a predetermined organization, etc.). In another embodiment, the one or more historical instances of the device usage may be identified by monitoring device usage, logging historical instances of device usage, etc.

In yet another embodiment, the one or more historical instances of the device usage may be received at a cloud computing environment. For example, the one or more historical instances of the device usage may be sent from one or more devices (e.g., mobile computing devices, etc.) to the cloud computing environment.

Further, as shown in FIG. 4, method 400 may proceed with operation 404, where historical contextual data is determined for each of the one or more historical instances of the device usage. In one embodiment, the historical contextual data may include a time each instance of usage occurred, a location where each instance of usage occurred, etc. In another embodiment, the historical contextual data may include an activity being performed by a user during each instance of historical instances of device usage by the user. For example, the activity may include running, driving, sitting, etc.

Further still, in one embodiment, the historical contextual data may include a role of a user performing the historical instances of device usage. For example, the role may include that of a customer during a transaction, a presentation during a meeting, etc. In another embodiment, the historical contextual data may include a proximity and relevance of one or more devices in communication with the device being used. For example, the historical contextual data may consider the internet of things (IoT) and may include an identification of one or more devices (e.g., point of sale sensors, computing devices, beacons, etc.) that communicated with the device (or were within communication range of the device) during the historical usage of the device.

Also, in one embodiment, the historical contextual data may include an identification of external data associated with the one or more historical instances of the device usage. For example, the external data may include calendar data (e.g., data stored within a calendar application indicating a scheduled event, etc.), email data (e.g., data stored within a messaging application indicating a scheduled event, etc.), etc.

In another embodiment, the historical contextual data may be received at a cloud computing environment. For example, the historical contextual data may be sent from one or more devices (e.g., mobile computing devices, etc.) to the cloud computing environment.

In addition, as shown in FIG. 4, method 400 may proceed with operation 406, where an event is created in association with the one or more historical instances of the device usage and the historical contextual data. In one embodiment, creating the event may include giving the event an event identifier. In another embodiment, the creating the event may include associating the event identifier with the one or more historical instances of the device usage as well as the historical contextual data. For example, the one or more historical instances of the device usage and the historical contextual data may all be labelled with the event identifier.

Furthermore, in one embodiment, the event identifier may include a description of the event. For example, the event identifier may include terms such as "meeting," "purchasing lunch," "working at desk," etc. In another embodiment, the event may be manually created (e.g., by an administrator, by the user, etc.). In another embodiment, the event may be automatically determined (e.g., based on past event creation in association with other historical instances of device usage for one or more users, etc.). In yet another embodiment, the event may be created within a cloud computing environment.

Further still, as shown in FIG. 4, method 400 may proceed with operation 408, where a real-time occurrence of the event is identified by comparing real-time contextual data to the historical contextual data. In one embodiment, the real-time contextual data may include contextual data identified by monitoring one or more aspects of a user's real-time device usage. For example, the real-time contextual data may be identified by monitoring a location of a user, a time of device usage by the user, calendar data created by or for the user, etc.

Also, in one embodiment, the occurrence of the event may be identified by comparing the real-time contextual data to historical contextual data that is labelled with the event identifier for the event. In another embodiment, when all (or a portion) of the real-time data matches the historical contextual data labelled with the event identifier for the event, an occurrence of the event may be identified. In yet another embodiment, when an amount of the real-time data matching the historical contextual data labelled with the event identifier for the event exceeds a predetermined threshold, an occurrence of the event may be identified.

Additionally, in one embodiment, a classifier may be trained to identify the occurrence of the event. For example, the classifier may be trained with the historical contextual data and associated event identifier. The classifier may then analyze input real-time contextual data in order to identify the occurrence of the event in response to detecting data associated with the event identifier.

In another embodiment, the occurrence of the event may be identified utilizing a server computer and/or a cloud computing environment. For example, the historical contextual data may be stored at a cloud computing environment and may be compared to real-time contextual data received at the cloud computing environment.

Further, as shown in FIG. 4, method 400 may proceed with operation 410, where in response to identifying the occurrence of the event, one or more aspects of a user interface (UI) of the device are adjusted based on the one or more historical instances of the device usage. In one embodiment, the one or more aspects of the UI of the device may be adjusted based on all historical instances of device usage associated with the event (e.g., labelled with the event identifier, etc.). For example, the historical instances of device usage may be analyzed to determine one or more applications that are likely to be used by the user of the device during the occurrence of the event.

Further still, in one embodiment, an application selector may be trained to identify one or more applications likely to be used during the occurrence of the event. For example, the application selector may be trained with details of historical instances of device usage associated with the event identifier, and may then identify one or more relevant applications in response to the identification of the occurrence of the event.

Also, in one embodiment, adjusting the one or more aspects of the UI of the device may include selecting one or more applications to be run on the one or more devices. In another embodiment, adjusting the one or more aspects of the UI of the device may include configuring the UI of the device. For example, adjusting the one or more aspects of the UI of the device may include changing an order of one or more applications displayed using the UI, changing a size of one or more icons displayed by the UI, changing a placement of icons displayed by the UI, changing a color of one or more icons displayed by the UI, changing an opacity of one or more icons displayed using the UI, etc.

In addition, in one embodiment, one or more additional devices that are currently available to the user may be determined in response to identifying the occurrence of the event. For example, all devices in communication with a first user device may be determined (e.g., utilizing one or more wireless communication protocols, a global positioning system (GPS), one or more beacons, etc.). In another embodiment, one or more aspects of the UI of the one or additional devices may be adjusted in response to identifying the occurrence of the event.

In this way, historical usage and context may be analyzed in order to tailor a UI of a device to certain situations in real-time.

Figure 5:
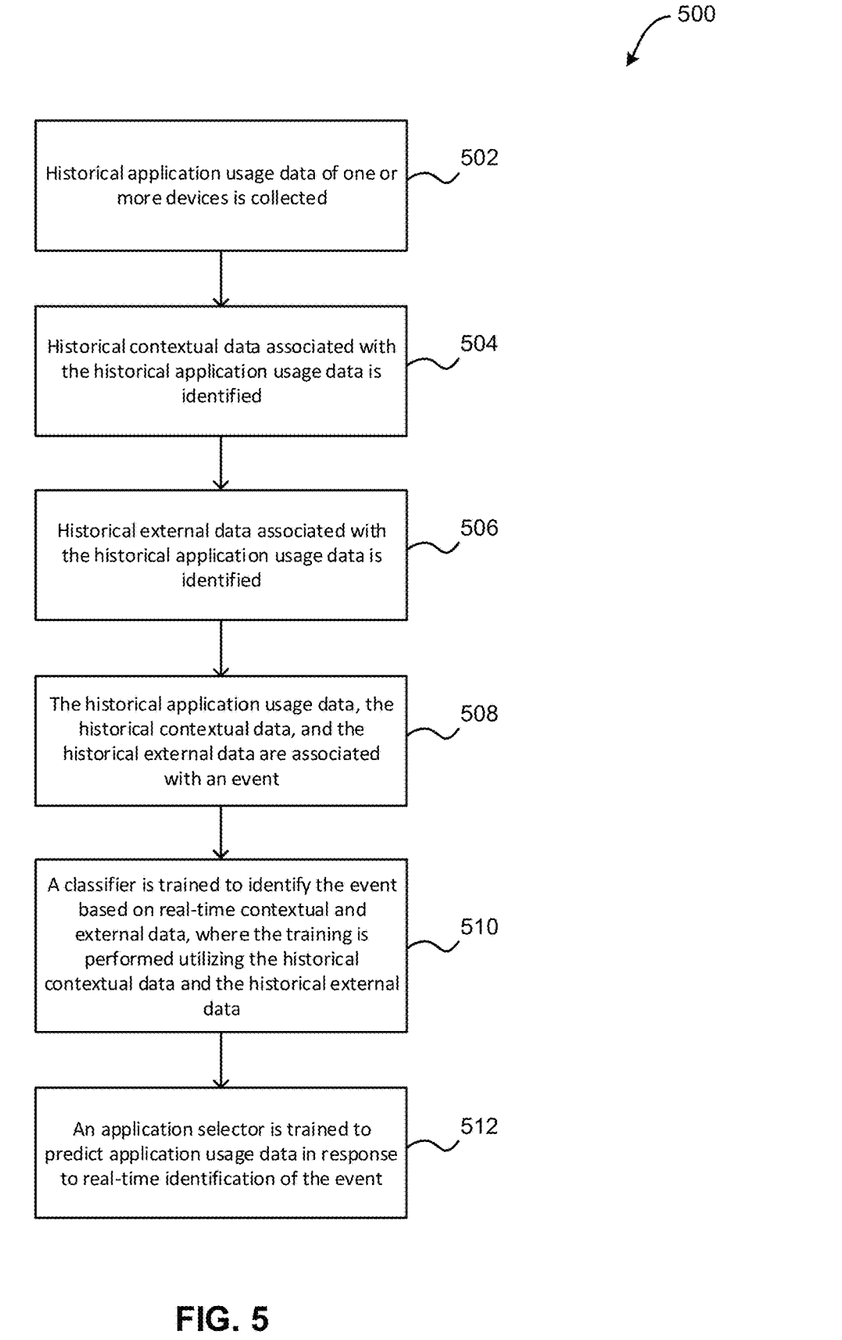
FIG. 5 illustrates a method for obtaining historical data for training, in accordance with one embodiment.

Now referring to FIG. 5, a flowchart of a method 500 for obtaining historical data for training is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where historical application usage data of one or more devices is collected. In one embodiment, the application usage data may include data describing personal usage of a device. For example, the application usage data may indicate a use of an application to purchase an item, send an email message, draft a document, present material visually, etc. In another embodiment, the application usage data may include data describing application usage by a plurality of users within a group (e.g., an organization, a club, etc.). In yet another embodiment, the application usage data may include data describing application usage by one or more devices themselves. For example, a device may utilize one or more applications to automatically access one or more networks, send data, receive data, etc.

Additionally, method 500 may proceed with operation 504, where historical contextual data associated with the historical application usage data is identified. In one embodiment, the historical contextual data may include a location of application usage, a time of application usage, etc. In another embodiment, the historical contextual data may be identified using software (e.g., clock software, etc.), global positioning system (GPS) hardware and software, hardware and software beacons, etc.

Further, method 500 may proceed with operation 506, where historical external data associated with the historical application usage data is identified. In one embodiment, the historical external data may include calendar data indicating an event, a planned usage of an application, etc. In another embodiment, the historical external data may include message data (e.g., email message data, text message data, etc.) indicating an event, a planned usage of an application, etc.

Further still, method 500 may proceed with operation 508, where the historical application usage data, the historical contextual data, and the historical external data are associated with an event. For example, an event identifier (e.g., a label, etc.) may be added to the historical application usage data, the historical contextual data, and the historical external data. In another embodiment, the event identifier may be added manually by a user or may be added automatically based on past labels and event identifications.

Also, method 500 may proceed with operation 510, where a classifier is trained to identify the event based on real-time contextual and external data, where the training is performed utilizing the historical contextual data and the historical external data. In one embodiment, training the classifier may include inputting the historical contextual data, the historical external data, and the associated event identifier into a supervised machine learning algorithm so that the classifier may recognize an occurrence of an event in response to detecting real-time contextual and external data matching the historical contextual and external data.

In addition, method 500 may proceed with operation 512, where an application selector is trained to predict application usage data in response to real-time identification of the event. In one embodiment, the application selector may be trained by inputting the historical application usage data and associated event identifier into a supervised machine learning algorithm so that the application selector may predict an application to be used by a particular device in response to a recognition of an occurrence of an event.

Figure 6:
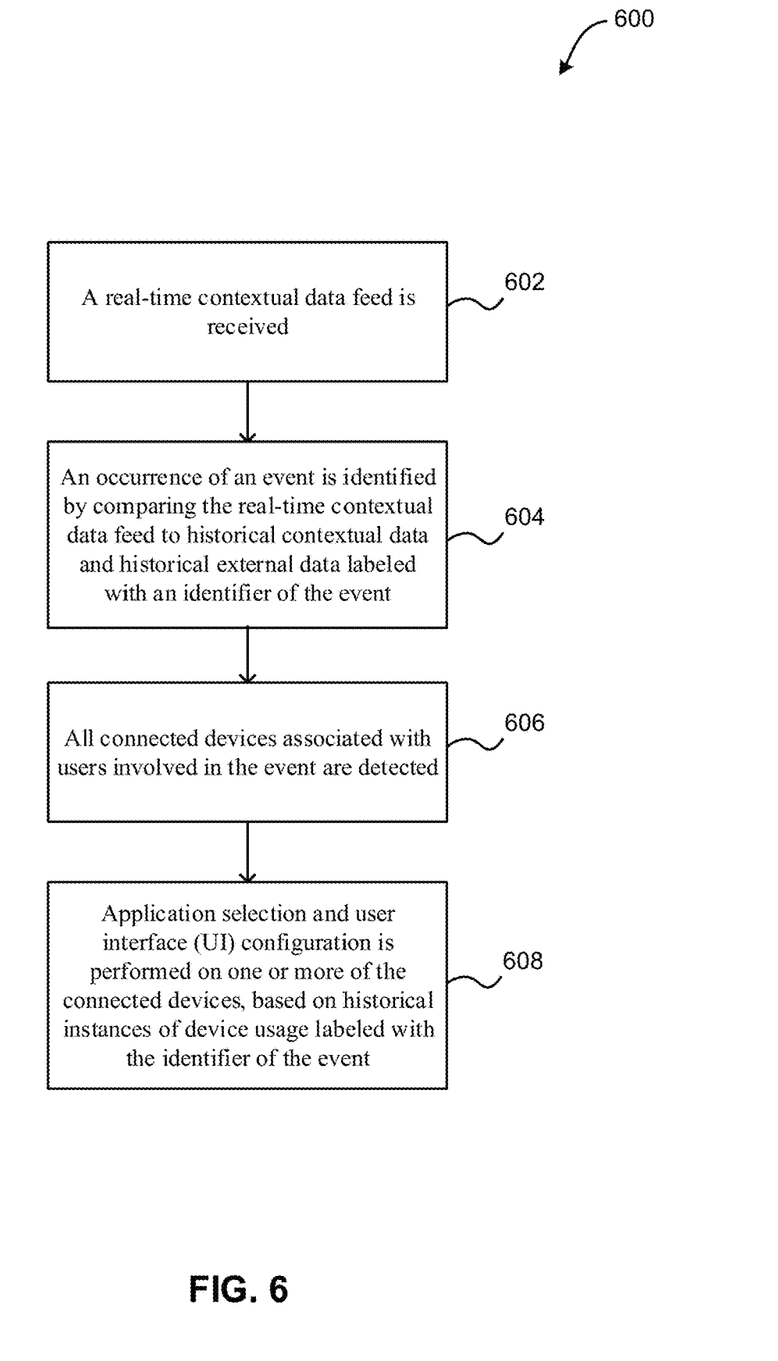
FIG. 6 illustrates a method for configuring an interface in real-time, in accordance with one embodiment.

Now referring to FIG. 6, a flowchart of a method 600 for configuring an interface in real-time is shown according to one embodiment. The method 600 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a real-time contextual data feed is received. In one embodiment, the real-time contextual data feed may include contextual data received from a plurality of users in real-time. For example, the real-time contextual data feed may include a current location of one or more users, a current time, etc. In another embodiment, the real-time contextual data feed may include external data (e.g., current calendar information, current message information, etc.).

Additionally, method 600 may proceed with operation 604, where an occurrence of an event is identified by comparing the real-time contextual data feed to historical contextual data and historical external data labeled with an identifier of the event. In one embodiment, the identification may be made by a classifier trained utilizing historical contextual data, historical external data, and associated event labels.

Further, method 600 may proceed with operation 606, where all connected devices associated with users involved in the event are detected. In one embodiment, the connected devices may include all devices currently accessible by the users during the event. In another embodiment, the connected devices may be detected by identifying all devices currently on one or more predetermined networks, currently within a predetermined area associated with the event, etc.

Further still, method 600 may proceed with operation 608, where application selection and user interface (UI) configuration is performed on one or more of the connected devices, based on historical instances of device usage labeled with the identifier of the event. In one embodiment, the application selection may be performed utilizing an application selector trained utilizing historical instances of device usage and associated event labels. For example, the application selector may predict an application to be used by a particular device in response to a recognition of an occurrence of the event, and may therefore run the application on the particular device when the event is detected.

Also, in one embodiment, the user interface configuration may include adjusting a size of one or more application icons within the UI of one or more of the devices. In another embodiment, the user interface configuration may include adjusting a placement of one or more application icons within the UI of one or more of the devices. In yet another embodiment, the user interface configuration may include adjusting a color of one or more application icons within the UI of one or more of the devices, an opacity of one or more application icons within the UI of one or more of the devices, etc.

In one exemplary scenario, a user may purchase an item on-site at a retail store. In this scenario, the historical usage data may include a use of a payment application on a mobile device of the user to pay for one or more items purchased by the user. The associated contextual data in this scenario may include a time of the usage of the payment application, which may be identified using a clock of the mobile device used to send payment.

Further, additional contextual data may include a location of the user within the store, which may be identified utilizing a GPS module within the mobile device (or a beacon installed at a payment location within the retail store that identifies a distance of the mobile device from the payment location). Further contextual data may include a presence of a wireless payment node at the store that is communicating with the mobile device of the user. External data may include a text message sent by the user indicating that they are planning on purchasing an item at the retail store.

Also, the historical usage data, contextual data, and external data may then be labeled as "retail payment" data for the user. The contextual data, external data, and "retail payment" label may then be used to train a classifier in a cloud computing environment to identify a "retail payment" event by identifying real-time contextual and external data matching the historical contextual and external data. The historical usage data and "retail payment" label may then be used to train an application selector in a cloud computing environment to determine that the payment application is to be run on the mobile device of the user when the "retail payment" event is identified.

Additionally, real-time contextual and external data is then identified and analyzed. When the real-time contextual and external data shows that the mobile device of the user is within the store and near a wireless payment node at the store, the classifier may determine that the "retail payment" event is occurring for the user. In response to this determination, the application selector may then reorganize application icons within a UI of the mobile device such that the payment application is listed as the first icon, is enlarged compared to other icons, etc.

In another exemplary scenario, a first user may present a report to a plurality of other users within a group. In this scenario, the historical usage data may include a use of a presentation application by a device of the first user to present the report, and a use of a word processing application by devices of the plurality of other users within the group in order to take notes on the presentation.

Further, the associated contextual data in this scenario may include a time of the usage of the presentation and word processing applications, which may be identified using a clock of the devices used to present the report and take notes. Additional contextual data may include a location of the users within a building, which may be identified utilizing a GPS module within one or more mobile devices of the users (or a location beacon installed within a meeting room). External data may include calendar data retrieved from one or more of the users indicating that a meeting is to take place at the time the report is presented, emails discussing the meeting, etc.

Also, the historical usage data, contextual data, and external data may then be labeled as "work meeting" data for each of the plurality of users. The contextual data, external data, and "work meeting" label may then be used to train a classifier in a cloud computing environment to identify a "work meeting" event by identifying real-time contextual and external data matching the historical contextual and external data. The historical usage data and "work meeting" label may then be used to train an application selector in a cloud computing environment to determine that certain applications are to be run on devices of users within the group when the "work meeting" event is identified.

Additionally, real-time contextual and external data is then identified and analyzed. When the real-time contextual and external data shows that the users within the group are within a meeting room at a predetermined time, the classifier may determine that the "work meeting" event is occurring for the group of users. In response to this determination, the application selector may automatically reorganize application icons within a UI of the device such that the presentation application is listed as the first icon, is enlarged, etc. The application selector may also automatically reorganize application icons within a UI of the devices of the plurality of other users within the group such that the word processing application is listed as the first icon, is enlarged, etc.

In this way, an interaction of one or more users with their devices may be improved, based on historical behavioral and contextual data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    identifying one or more historical instances of device usage;
    determining historical contextual data for each of the one or more historical instances of the device usage, the historical contextual data including:
        an activity being performed by a user during each of the one or more historical instances,
        a role of a user performing each of the one or more historical instances, and
        an identification of one or more additional devices that communicated with the device during each of the one or more historical instances of the device usage;
    creating an event in association with the one or more historical instances of the device usage and the historical contextual data;
    training a classifier to identify the event by inputting the historical contextual data and an associated event identifier into a machine learning algorithm;
    identifying, using the trained classifier, a real-time occurrence of the event, utilizing real-time contextual data and the historical contextual data, the real-time contextual data including current calendar information and current message information, where the trained classifier analyzes the real-time contextual data to identify the real-time occurrence of the event; and
    in response to identifying the real-time occurrence of the event:
        adjusting one or more aspects of a user interface (UI) of the device based on the one or more historical instances of the device usage,
        determining one or more additional devices in communication with the device, and adjusting one or more aspects of the UI of the one or more additional devices.

2. The computer-implemented method of claim 1, wherein the one or more historical instances of the device usage are identified for a single user or for a predetermined group of users.

3. The computer-implemented method of claim 1, wherein the historical contextual data further includes a time each of the one or more historical instances of the device usage occurred and a location where each of the one or more historical instances of the device usage occurred.

4. The computer-implemented method of claim 1, wherein the historical contextual data further includes an identification of external data associated with the one or more historical instances of the device usage.

5. The computer-implemented method of claim 1, wherein creating the event includes associating an event identifier of the event with the one or more historical instances of the device usage and the historical contextual data.

6. The computer-implemented method of claim 1, wherein the real-time contextual data includes contextual data identified by monitoring one or more aspects of a user's real-time device usage.

7. The computer-implemented method of claim 1, wherein adjusting the one or more aspects of the UI of the device includes changing an order of one or more applications displayed using the UI.

8. The computer-implemented method of claim 1, wherein the historical contextual data is stored at a cloud computing environment and is compared to the real-time contextual data received at the cloud computing environment.

9. The computer-implemented method of claim 1, wherein the historical contextual data further includes external data associated with the one or more historical instances of the device usage, including data stored within a calendar application and a messaging application.

10. The computer-implemented method of claim 1, wherein the one or more historical instances of the device usage are identified for a predetermined group of users.

11. A computer program product for implementing a context aware user interface (UI), the computer program product comprising a computer readable storage medium having program instructions embodied therewith, wherein the computer readable storage medium is not a transitory signal per se, the program instructions executable by a processor to cause the processor to perform a method comprising:
identifying one or more historical instances of device usage, utilizing the processor;
determining historical contextual data for each of the one or more historical instances of the device usage, utilizing the processor, the historical contextual data including:
an activity being performed by a user during each of the one or more historical instances,
a role of a user performing each of the one or more historical instances, and
an identification of one or more additional devices that communicated with the device during each of the one or more historical instances of the device usage;
creating an event in association with the one or more historical instances of the device usage and the historical contextual data, utilizing the processor;

training a classifier to identify the event by inputting the historical contextual data and an associated event identifier into a machine learning algorithm, utilizing the processor;
identifying, using the trained classifier, a real-time occurrence of the event, utilizing the processor and real-time contextual data and the historical contextual data, the real-time contextual data including current calendar information and current message information, where the trained classifier analyzes the real-time contextual data to identify the real-time occurrence of the event; and
in response to identifying the real-time occurrence of the event:
adjusting, utilizing the processor, one or more aspects of a UI of the device based on the one or more historical instances of the device usage,
determining, utilizing the processor, one or more additional devices in communication with the device, and
adjusting, utilizing the processor, one or more aspects of the UI of the one or more additional devices.

12. The computer program product of claim 11, wherein the one or more historical instances of the device usage are identified for a single user or for a predetermined group of users.

13. The computer program product of claim 11, wherein the historical contextual data further includes a time each of the one or more historical instances of the device usage occurred and a location where each of the one or more historical instances of the device usage occurred.

14. A system, comprising:
a processor; and
logic integrated with the processor, executable by the processor, or integrated with and executable by the processor, the logic being configured to:
identify one or more historical instances of device usage;
determine historical contextual data for each of the one or more historical instances of the device usage, the historical contextual data including:
an activity being performed by a user during each of the one or more historical instances,
a role of a user performing each of the one or more historical instances, and
an identification of one or more additional devices that communicated with the device during each of the one or more historical instances of the device usage;
create an event in association with the one or more historical instances of the device usage and the historical contextual data;
train a classifier to identify the event by inputting the historical contextual data and an associated event identifier into a machine learning algorithm;
identify, using the trained classifier, a real-time occurrence of the event, utilizing real-time contextual data and the historical contextual data, the real-time contextual data including current calendar information and current message information, where the trained classifier analyzes the real-time contextual data to identify the real-time occurrence of the event; and
in response to identifying the real-time occurrence of the event:
adjust one or more aspects of a user interface (UI) of the device based on the one or more historical instances of the device usage,
determine one or more additional devices in communication with the device, and adjust one or more aspects of the UI of the one or more additional devices.

\* \* \* \* \*